Oct. 14, 1958   M. F. PETERS   2,855,783
MOTION TRANSMISSION IN SEALED FLUID SYSTEMS
Filed June 28, 1955   2 Sheets-Sheet 1

INVENTOR.
Melville F. Peters
BY
Martin J. Finnegan
ATTORNEY

Oct. 14, 1958 M. F. PETERS 2,855,783
MOTION TRANSMISSION IN SEALED FLUID SYSTEMS
Filed June 28, 1955 2 Sheets-Sheet 2

INVENTOR.
Melville F. Peters
BY
Martin J. Finnegan
ATTORNEY

United States Patent Office 2,855,783
Patented Oct. 14, 1958

2,855,783

MOTION TRANSMISSION IN SEALED FLUID SYSTEMS

Melville F. Peters, Livingston, N. J.

Application June 28, 1955, Serial No. 518,534

8 Claims. (Cl. 74—57)

This invention relates to combining fluid seals or bellows with a mechanical assembly and in particular with the transmission of power into a hermetically sealed chamber by imparting a reciprocating motion to one or more bellows and converting this motion through a mechanical assembly into a rotary motion or a linear displacement.

The most general way of opening and closing a fluid valve is to rotate a threaded spindle in a bonnet or a threaded female section of the valve assembly, so that a disk or plate can be positioned or removed from a mating surface. Regardless of the construction, the flow of fluid through the valve can always be controlled by subjecting the spindle to a rotation, or a translation, or to both a rotation and translation.

Recently power stations and chemical plants have been put into operation which require the control of fluids operating at high pressures and moving at high velocities. These fluids are controlled by valves and since many of the fluids are poisonous or radioactive, the valves are prevented from leaking by replacing the stuffing glands with bellows. When the operating pressures are low, the elongation for unit length of bellows is relatively great. As the pressures are increased the length of the bellows must be increased to keep the ratio between plate deflection and plate stress constant. This change in bellows length with pressure increases very rapidly and as shown in the patent application of Melville F. Peters, Serial Number 416,463, the applicant in this application, a bellows having a free length of 8.75 inches and a 3 inch stroke, would have to be increased to 12.1 feet to permit the same stroke with the same plate stress when the pressure is increased from 100 p. s. i. to 2500 p. s. i.

As the output of these stations and plants is increased the size of the valve must be increased and this in turn will require an increase in the stroke of the bellows. Unfortunately, the room allowed for these valves does not increase in direct proportion to the size of the power plant and in general, the space reserved for a high pressure valve is not much greater than it is for a low pressure valve. At the present time the bellows is the only flexible fluid seal which can be operated at high temperatures and when properly designed can be stroked through a small percentage of its length at high pressures without failing before completing a known life cycle. Since it is possible to convert relatively small reciprocating displacements into rotary motions which are continuous in direction, or to linear displacements which are continuous in direction, or to a combination of these motions which are continuous in the direction in which the motions are initiated, it is possible to use a bellows to hermetically seal a chamber and to transmit power through the seal by placing the bellows in the part of a mechanical assembly which has its movements confined to a reciprocating motion. It is therefore the first object of the invention to use a mechanical assembly in combination with a bellows which is used to hermetically seal a chamber in a valve and to arrange the mechanical assembly so that it will move the disk, or plate, or other sealing cover a distance which is proportional to the number of reciprocating cycles executed by the bellows. It is a second object of the invention to use a mechanical assembly to transmit a reciprocating motion to a bellows which is used as a hermetical seal in a valve chamber and by the use of a second mechanical assembly to convert the reciprocating motion transmitted through the seals into a rotary motion, or a linear displacement, or to a combination of these two motions. It is a third object of the invention to use a cam on a rotating shaft to impart a reciprocating motion to a bellows which is used to hermetically seal a chamber and by the use of a second mechanical assembly to convert the reciprocating motion transmitted through the seal into a rotary motion, or a linear displacement, or to a combination of these two motions.

In many units of an atomic power plant the fluid circulating in portions of the system are so corrosive that all moving parts such as the mechanical assembly must be hermetically sealed from the fluids. When the fluids are operating at a high temperature the flexible seals are limited to bellows and to conserve space the bellows should operate at low pressures, so that advantage may be taken of the relatively large ratio which is allowed between the elongation and the free length of a low pressure bellows. If the low pressure bellows is to be used as a seal for the mechanical assembly in the high pressure system, it is necessary to pressurize the valve chamber and to synchronize this applied pressure with the pressure in the system, so that the pressure differential between the chamber and the system can be maintained within the safe working pressure of the bellows. Methods of maintaining a low pressure differential across the bellows used for sealing the mechanical assembly from the system are fully described in the patent application of Melville F. Peters, Serial Number 475,475, filed Dec. 15, 1954, the applicant in this application, and the described methods are applicable to this construction. It is therefore a fourth object of the invention to hermetically seal the mechanical assembly from the fluids in the system and to synchronize the pressure in the sealed valve chamber with the pressure in the system, so that the pressure differential between the chamber and the system does not exceed the safe working pressure of the sealing bellows.

To simplify the description of the invention the word peg will refer to any element regardless of its shape and method of suspension which projects into a groove or thread and the word rider will refer to any element regardless of its shape and manner of suspension which rides on a thread and when the two ends of a groove or thread are joined together to form a close path for the peg or rider, the groove or thread will be referred to as a closed loop or a closed groove or thread.

A peg or rider projecting into a groove or riding on a thread which forms a closed loop on a cylindrical surface can be used to force the cylindrical element to rotate about its axis when the peg or rider executes a reciprocating motion in a plane parallel to the axis of the cylindrical element and conversely if the peg or rider is part of the cylindrical element, the element can be forced to rotate about its axis if the peg or rider is held in a closed groove or thread which is executing a reciprocating motion in a plane parallel to the axis of the cylinder. When the reciprocating element is attached to a bellows, the combination of the bellows, the peg or rider and the closed loop can be used to transmit power into a sealed chamber by forcing the bellows assembly to execute a reciprocating motion. It is therefore the fifth object of the invention to use a mechanical assembly to force a bellows which is used to hermetically seal a chamber to execute a reciprocating motion and by the use of a peg which is forced to follow a closed "endless" groove cut in a cylindrical element, or a rider which is forced to follow a thread on a cylindrical element, convert the reciprocating motion of the bellows into a rotary motion of the cylindrical element for the purpose of doing useful work.

It is a sixth object of the invention to use a mechanical assembly to force a bellows which is used to hermetically seal a chamber to execute a reciprocating motion and by the use of a closed loop groove or thread which is attached to the bellows, force the peg or rider which is free to rotate about its axis to follow the groove or thread, so that the reciprocating motion of the groove or thread which is attached to the bellows, will be converted into rotating the peg or rider about its axis for the purpose of doing useful work. It is a seventh object of the invention to impart a reciprocating motion to a bellows which is used as a fluid seal by means of a mechanical assembly and by forcing a peg or rider to follow a closed groove or thread, convert the reciprocating movement of the bellows assembly into a rotary motion of an element which is free to rotate, so that the rotary motion which can be converted into a linear displacement will be proportional to the number of reciprocating cycles executed by the bellows assembly, or proportional to the amplitude of the reciprocating assembly, or to both the number of reciprocating cycles and their amplitude.

A bellows will experience a reciprocating motion when a pulsating pressure which is applied to one side of the bellows oscillates about the pressure acting on the other side of the bellows. Since the reciprocating motion of the bellows is independent of the absolute pressure in the system and depends only upon the pressure differential across the bellows, it is possible to establish this reciprocating motion in a low pressure bellows operating in a high pressure system. This reciprocating motion of the bellows can then be converted in the chamber which is hermetically sealed by the bellows into a rotary motion, or a linear displacement, so that it is possible to use low pressure bellows throughout the high pressure valve. It is therefore an eighth object of the invention to impart a reciprocating motion to a bellows which is used as a fluid seal by subjecting the bellows to a pulsating fluid pressure. It is a ninth object of the invention to impart a reciprocating motion to a bellows which is used as a fluid seal by subjecting the bellows to a pulsating fluid pressure and by means of a mechanical assembly convert the reciprocating motion of the bellows into a rotary motion, or a linear displacement, or a combination of the rotary motion and the linear displacement which is proportional to the amplitude of the pulsations, or the number of pulsating cycles, or to both the amplitude and the number of cycles executed by the bellows assembly. It is a tenth object of the invention to impart a reciprocating motion to a bellows which is used as a fluid seal, so that the bellows assembly executes a reciprocating motion and by the use of a peg which is forced to follow a closed groove on a cylindrical element which is free to rotate, or a rider which is forced to follow a closed thread on a cylindrical element which is free to rotate, convert the reciprocating movement of the bellows into a rotary motion of the cylindrical element for the purpose of doing useful work. It is an eleventh object of the invention to apply a pulsating pressure to a bellows assembly which is used as a fluid seal, so that the bellows and a closed groove or thread which is part of the assembly is forced to execute a reciprocating motion and by forcing the peg or rider which is free to rotate about an axis to follow the groove or thread, convert the reciprocating motion of the bellows assembly into rotating the peg or rider about an axis for the purpose of doing work.

When the reciprocating motion of the bellows assembly is to be used to produce a reciprocating or oscillating motion of the shaft in the sealed chamber of 360° or less, it is not necessary to have a closed thread or groove. It is therefore a twelfth object of the invention to convert the reciprocating motion of the bellows assembly which is used to hermetically seal a chamber to a reciprocating or oscillating motion in the chamber by using a mechanical assembly which consists of a peg or rider traveling in a groove or on a thread which is not parallel throughout to the axis of the rotating element.

For the conversion of the reciprocating motion of the bellows assembly into a continuous rotation of the rotating element, it is necessary to make the amplitude of the reciprocating element equal to the distance between the loops of the groove or thread along the axis of rotation. It is therefore a thirteenth object of the invention to impart a reciprocating motion to a bellows assembly which transmits at least a part of this reciprocating motion to a peg or rider, or a groove or thread and to make the part of the reciprocating motion of the peg, rider, groove or thread which is parallel to the axis of rotation equal to the longitudinal distance between the extremities of the loops.

The dead center position of the peg or rider in the groove or thread is where the tangent to the loops of the groove or threads are normal to the axis of rotation and in most grooves or threads will be at the extremities of the loops. When the peg is at any part of the groove except the extremities, the direction of rotation of the shaft can be controlled by the direction in which the reciprocating motion is initiated. It is therefore a fourteenth object of the invention to control the direction of rotation of a mechanical assembly consisting of a bellows, a peg or rider and a groove or thread, by the direction in which the reciprocating motion is initiated.

The force exerted by the peg or rider on the groove or thread can be resolved into a component normal to the axis of rotation and a force parallel to this axis. The force normal to the axis will cause the element to rotate and the force along the axis will displace the rotating element unless it is held in place. One method of holding the element in place is to use thrust bearings and it is therefore a fifteenth object of the invention to provide thrust bearings to prevent displacement of the rotating element along the axis of rotation.

A component of force which is equal in magnitude and opposite in direction to the force acting normal to the axis of the rotating element must be supplied by some element of the reciprocating assembly. If the peg or rider is rigidly secured to the bellows, a twisting force will be developed in the bellows and if the torque is great enough the life of the bellows will be greatly reduced. The twisting force exerted on the bellows can be eliminated by using guides to prevent a displacement of the reciprocating assembly normal to the axis of rotation and transmitting the reciprocating motion from the bellows to the support for the peg or rider through a swivel joint. It is therefore a sixteenth object of the invention to eliminate the twisting force on the bellows by using guides to force the reciprocating assembly to move parallel to the axis of rotation and to transmit the reciprocating motion from the bellows to the support for the reciprocating assembly through a swivel joint.

When the reciprocating motion is supplied to the bellows assembly by a cam or crank shaft some provision must be made for manufacturing tolerances and the wearing away of the parts, so that small departures between the amplitude of the reciprocating element and the distance between the extremities of the loops will not lead to binding of the peg or rider with the groove or thread. The simplest means of eliminating the binding between peg and groove is to increase the width of the groove at the extremities of the loop and for the same reason the binding between rider and thread can be prevented by decreasing the width of the threads at the extremities of the loops. When this is not feasible springs can be incorporated into the assembly to allow displacements between the rotating and reciprocating parts without stressing parts of the assembly beyond the elastic or allowable limit of the material. It is therefore a seventeenth object of the invention to increase the width of the grooves or decrease the width of the threads at the extremities of the grooves or threads, so as to reduce the probability of the reciprocating parts binding at the extremities of the loops. It is an eighteenth object of the invention to put springs in one or more elements of the mechanical assembly so that adjustments will be made for differences between the amplitude of the reciprocating element of the assembly and the distance between the extremities of the loops, without overstressing one or more parts of the assembly.

The invention does not limit the shape of the grooves to the circular form shown in the drawings, because grooves and threads which are square, rectangular or V-shaped will serve equally well when the pegs and riders are formed and suspended to mate with them.

Figure 2:
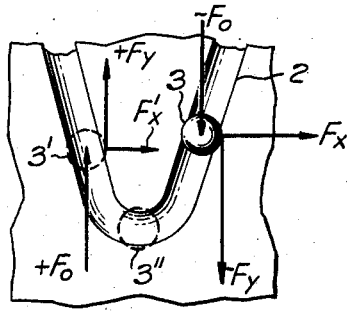
Figure 2 is a view of an enlarged section of the curve shown in Figure 1.
Figure 1:
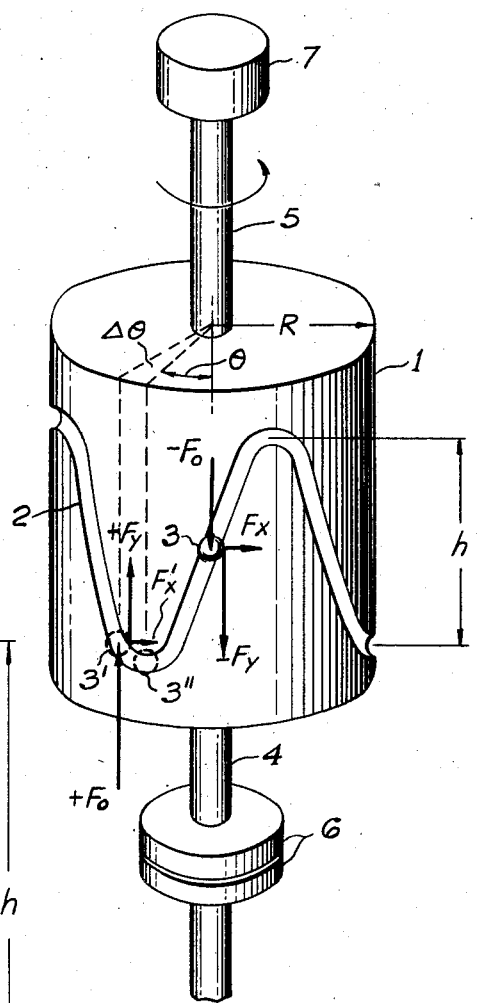
Figure 1 shows a closed groove or thread having a circular cross section and spread out in sinusoidal form over a cylindrical element which is free to rotate about an axis when a tangential force is applied by moving one or more pegs parallel to the axis of the rotating element, together with thrust bearings to prevent a displacement of the rotor along the axis of rotation.
Figure 5:
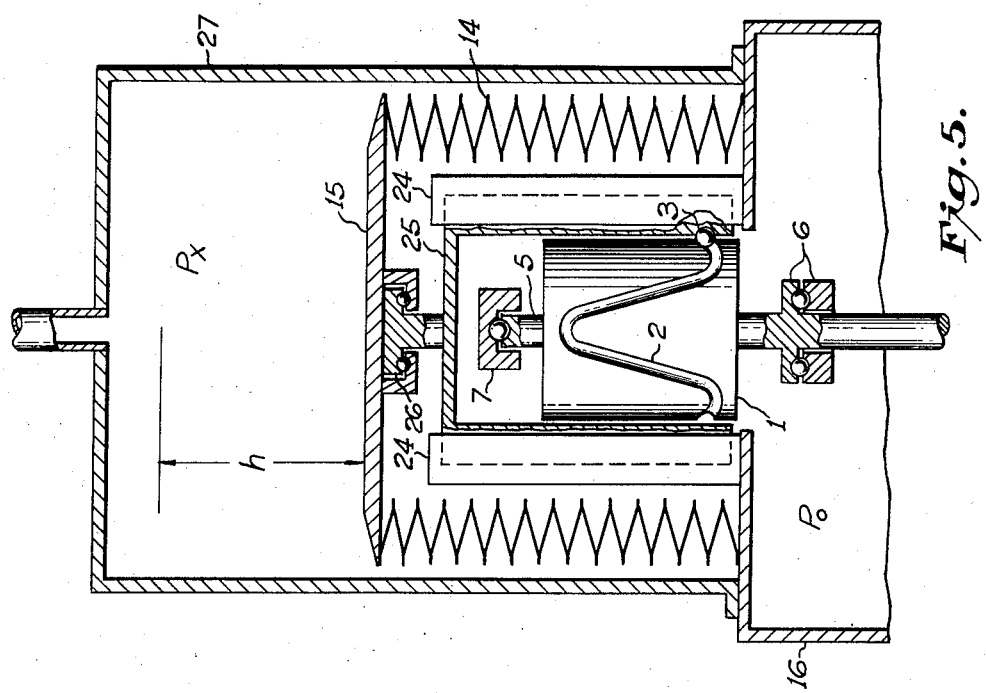

Figure 5 is a view of an assembly embodying the cylindrical element, shaft and bearings shown in Figures 1 and 2 with a guided support for the peg to prevent it from rotating, a swivel bearing between the guide and bellows and a cap surrounding the bellows so as to form a fluid tight chamber between cap and bellows which permits a pulsating fluid pressure in the chamber to force the bellows assembly to execute a reciprocating motion and force the cylindrical element to rotate, an embodiment of the invention.

Figure 1 shows a cylindrical element 1 which is free to rotate about the axis 4 and 5 when a tangential force $Fx$ is applied so that it produces a turning movement of $Fx.R$, where R is the effective radius of the sinusoidal groove or thread 2 cut into the surface of 1. The two ends of the groove are joined together to form a closed path so that a ball or suitably shaped peg can remain in the groove as the cylindrical element rotates. When the force $-Fo$ is applied to 3 parallel to the axis of rotation of the cylindrical element, a force is developed between 3 and the lower surface of thread 2. This force can be resolved into a component $-Fy$ parallel to the axis of rotation and a second component $Fx$ normal to the axis of rotation. The force $-Fy$ acting along the axis of rotation serves no useful purpose and is prevented from displacing the cylindrical element along the axis by the thrust bearing 6. The force $Fx$ acting at radius R produces a turning movement of $Fx.R$ and causes the axis 4 and 5 to rotate in bearings 6 and 7. If the force $-Fo$ acts on 3 until the cylindrical element has rotated through an angle $\theta$, the ball 3 will move to 3'' at the bottom of the groove. If at this instant the force is reduced to zero and during the time interval $\Delta t$ the momentum of the cylindrical assembly rotates the grooves through an angle $\Delta \theta$ so that 3'' moves to another new position 3' and then the force applied to ball 3 and 3' is reversed in direction from $-Fo$ to $+Fo$, the ball 3 will now act on the top part of groove 2 and will produce a force which can be resolved into a component $+Fy$ which acts up and a second component $F'x$ which produces a turning movement $F'x.R$ which is acting in the same direction as $Fx.R$, so that the turning movements $Fx.R$ and $F'x.R$ acting on the cylindrical element will force the cylinder to rotate counter clockwise. When ball 3 reaches top of the groove the force on 3 will be reduced to zero and after an interval of time $\Delta t$ during which time 1 will again rotate through an angle $\Delta \theta$, the force on 3 in its new position will be reversed from $+Fo$ to $-Fo$, so that it now produces a force on the bottom of the groove which can be resolved into the two components of force $-Fy$ and $Fx$. From this it follows that when 3 is acting down on the bottom of the thread and $Fo$ is taken negative, $Fy$ is negative, $Fx$ is positive and the torque $Fx.R$ will act in a counter clockwise direction, when 3 is acting up on the top of the thread, the force $Fo$ is positive, $Fy$ is positive, $Fx$ is positive and the torque $Fx.R$ will act in a counter clockwise direction, and consequently the direction of rotation of the cylindrical element will be the same when 3 is moving down as when it is moving up. When 3 is forced to execute a continuous reciprocating motion of amplitude $h$, the turning movements $Fx.R$ and $F'x.R$ will force the cylindrical element 1 and shafts 4 and 5 to rotate continuously in the direction in which the rotation is initiated. The two thrust bearings 6 and 7 prevent the cylindrical element 1 from being displaced along the axis of rotation by the forces $\pm Fo$.

The assembly 1, 4, 5, can be rotated in the opposite direction by bringing the assembly to rest between the extreme positions, as shown, and then applying a force $+Fo$ on 3 which forces it to act on the top of the groove 2 and then applying the force $-Fo$ on 3' so that it acts on the bottom of groove 2. If 3 is then forced to execute a continuous reciprocating motion of amplitude $h$, the assembly will be forced to rotate counter-clockwise. When the grooves are cut so that one revolution of the cylindrical element will require 3 to make $n$ reciprocating movements of amplitude $h$, where $n$ is a whole number, more than one peg or rider 3 can be used in the assembly.

Figure 3:
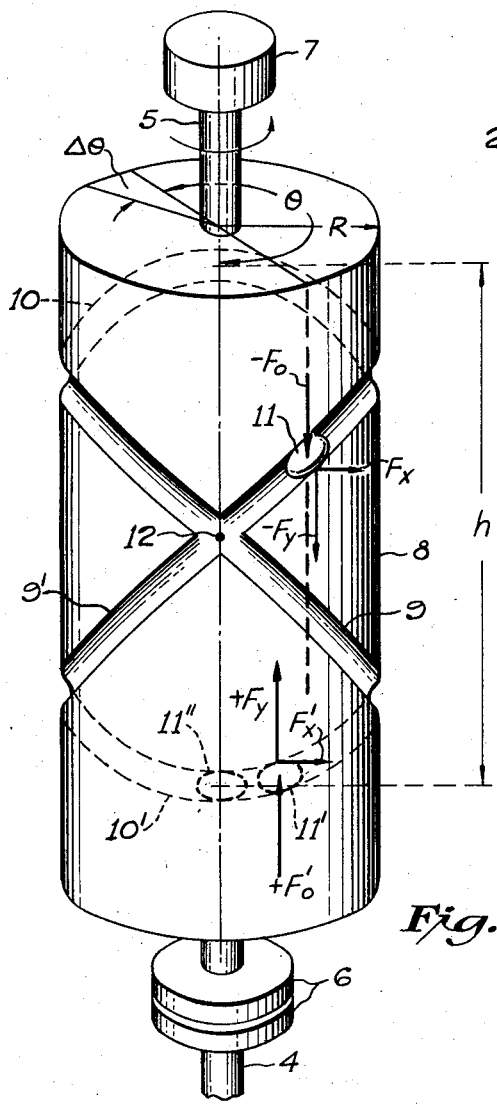
Figure 3 shows another type of closed groove or thread spread over a cylindrical element which is free to rotate about an axis when a tangential force is applied by moving a peg parallel to the axis of the rotating element, together with thrust bearings to prevent a displacement of the rotor along the axis of rotation.

Upon the surface of the cylindrical element 8 shown in Figure 3 is cut a right hand and a left hand thread 9 and 9' respectively which have their lower ends joined together by the groove 10' and their upper ends joined together by the groove 10, so that a groove is formed which has a continuous path and allows a suitably shaped object to remain in the groove as the cylindrical element is rotated about the two axes 4 and 5. When the force $-Fo$ is applied to 11 parallel to the axis of rotation, a force is developed between 11 and the lower surface of groove 9'. This force can be resolved into two components, $-Fy$ parallel to the axis of rotation and a second component $Fx$ normal to the axis of rotation. The force $-Fy$ acting along the axis of rotation is prevented from displacing the cylindrical element along the axis by the thrust bearing 6. The force $Fx$ acting at radius R produces the turning movement $Fx.R$ and causes the axes 4 and 5 to rotate in the bearings 6 and 7. If the force acts on 11 until the cylindrical element has rotated through an angle $\theta$, the peg 11 will move to 11'' which is at the bottom of the groove. If at this instant the force is reduced to zero and during the time interval $\Delta t$ the cylindrical assembly and groove rotates through an angle Δθ so that 11" moves to another new position 11' and then the force applied to ball 11 at 11' is reversed from —Fo to +Fo the ball 3 will act on the top part of groove 9 and produce a force which can be resolved into a component +Fy which acts up and a second component F'x which produces a turning movement F'x.R which acts in the same direction as Fx.R, so that the two turning movements F'x.R and Fx.R will force the cylindrical element 8 and shafts 4 and 5 to rotate counter clockwise when the rider 11 executes a reciprocating motion of amplitude h. If the cylindrical element is at rest and the force +Fo is applied to 11 so that 11 produces a force on the top of groove 2, the force Fx will act in the opposite direction and produce turning movement —Fx.R and —F'x.R so that for the same reason given in explaining Figure 1, the shaft will rotate in a clockwise direction.

When the rider 11 passes through the intersection 12 of the two grooves, it is necessary for it to be shaped so that it will not drop from groove 9' to 9 or from 9 to 9'. For this reason 11 is made longer than the width of the groove. When 11 is cut to the shape of a diamond or an ellipsoid it will pass through 9, 9', 10, 10' without binding or slipping from 9' to 9 at 12 and when a rectangular peg or rider is used it is customary to attach the rectangular segment to a swivel joint so that it may rotate through the curved part of the grooves and threads.

Figure 4:
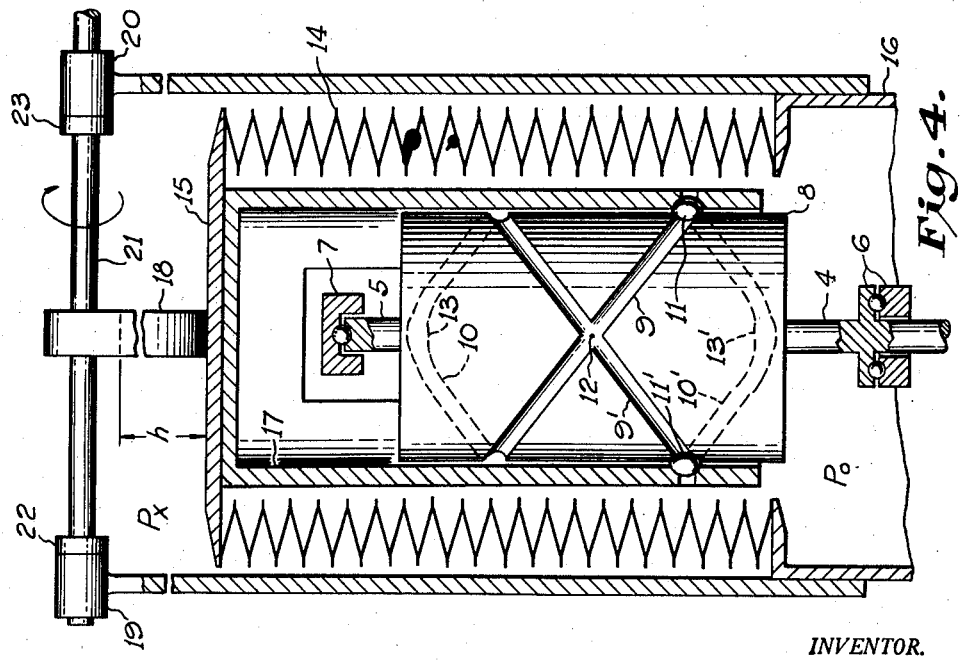
Figure 4 shows a view of an assembly embodying the cylindrical element, shaft and bearings shown in Figure 3, with the support for the peg attached to the bellows which hermetically seals a chamber and a power shaft operating a cam which forces the bellows assembly to execute a reciprocating motion, an embodiment of the invention.

In Figure 4, the cylindrical element 8, groove 9, 9', 10, 10' shafts 4, 5, bearings 6, 7 and rider 11 are the same in construction and operation as the parts having the same numbers in Figure 3 and consequently when 11 is forced to execute a reciprocating motion the cylindrical element and shaft will rotate. The reciprocating motion of 11 is obtained by rotating power shaft 21 which rotates cam 18, which in turn forces plate 15, peg support 17 and peg 11 to execute one cycle of reciprocating motion of amplitude h for each revolution of 18 and 21. The bellows 14 form a fluid tight seal so that the fluid at pressure Po cannot escape from the chamber 16. The bearings 19 and 20 for shaft 21 are secured to the chamber walls 16. Rings 22 and 23 prevent end movement of 21. Due to wear and manufacturing tolerances and displacement h of the cam 18 may not be or remain equal to the distance between the extremities of the loops of the groove. Compensations for these changes can be made by increasing the width of the groove at the extremities of the loop 13 and 13', or by supporting bearings 20 on stiff springs, or by using a spring connection some place between 21 and 11.

In Figure 5 the cylindrical element 1, groove 2, rider 3, shafts 4, 5, bearings 6, 7 and peg 3 are the same in construction and operation as the parts having the same numbers in Figure 1 and consequently when rider 3 is forced to execute a reciprocating motion the cylindrical element and shaft will rotate. The peg support 25 is free to move in a plane parallel to the axis of rotation but is prevented from turning by guides 24. Since some play will always take place in a moving guided member, the swivel joint 26 permits some play between 24 and 25 without subjecting the bellows 14 to the twisting movement. The reciprocating motion of 3 is obtained by making the pressure differential $(Px-Po)=\Delta P$ great enough to force plate 15, swivel joint 26, peg support 25 and peg 3 through an amplitude $-h$, where the movement down is taken as negative, after which the pressure Px is reduced until the pressure differential $$-(Px-Po)=-\Delta P$$

is great enough to force 3 through an amplitude of $+h$, so that by synchronizing the change in pressure of Px between the limits $Px=Po\pm\Delta P$ with the displacement of 3, the cylindrical element can be forced to rotate.

The converse mechanical assembly showing the peg or rider attached to the rotating element and the groove or thread executing a reciprocating motion is not shown in the drawings because they follow at once from the description of the four figures. When the internal pressure Po is small, springs may be placed between 15 and 24, or in other parts of the assembly, so that the force acting on the bellows will be equal to $-(OP.\overline{A}+K.x)$, where $\overline{A}$ is the effective or piston area of 14 and K is the force required to change the length of the spring by $x$ units.

In the appended claims the terms "cam" and "cam-follower" apply to the peg, or rider, and the groove, or thread, or to these elements in reverse arrangement; also to eccentric 18 (a "cam") and bellows plate 15 (a "cam-follower") and in addition the language is patterned upon certain claims of said prior applications, but with appropriate interpolations to specify the additional structure disclosed therein.

What I claim is:

1. A device for transmitting motion into a sealed chamber comprising, a bellows hermetically sealed at one end to the wall of the chamber, a sealing disc overlying the opposite end of the bellows, rotatable cam means in contact with said disc for imparting a reciprocating motion to the disc, a support element located within the bellows and secured to the under side of the sealing disc, a cylindrical member slidably mounted within the support element, a continuous sinuous groove in the outer surface of said cylindrical member, and a rider carried by the support element and slidable within the cylinder groove whereby the reciprocating motion of the disc will be translated into a desired movement of the cylinder.

2. A device for transmitting motion into a sealed chamber comprising, a bellows hermetically sealed at one end to the wall of the chamber, a sealing disc overlying the opposite end of the bellows, rotatable cam means in contact with said disc for imparting a reciprocating motion to the bellows, a grooved cylindrical support element secured within the bellows to the underside of the sealing disc, a cylindrical member slidably mounted within the support element, a continuous sinuous groove in the outer surface of said cylindrical member, and a rider carried by the support element groove and slidable within the cylinder groove whereby the reciprocating motion of the bellows will be translated into a desired movement of the cylinder.

3. A device for transmitting motion into a sealed chamber comprising, a bellows hermetically sealed at one end to the wall of the chamber, a sealing disc overlying the opposite end of the bellows, rotatable cam means in contact with said disc for imparting a reciprocating motion to the bellows, a grooved cylindrical support element secured within the bellows to the underside of the sealing disc, a cylindrical member slidably mounted within the support element, a continuous sinuous groove in the outer surface of said cylindrical member, a shaft-like axis secured to the cylindrical member and communicating with the interior of the chamber, and a rider carried by the support element groove and slidable within the cylinder groove whereby the reciprocating motion of the bellows will be translated into a desired movement of the cylinder.

4. A device for transmitting motion into a sealed chamber comprising, a bellows hermetically sealed at one end to the wall of the chamber, a sealing disc overlying the opposite end of the bellows, rotatable cam means in contact with said disc for imparting a reciprocating motion to the bellows, a support element secured within the belows to the underside of the sealing disc, a cylindrical member slidably mounted within the support element, a swivel joint between the cylinder and support element, a continuous sinuous groove in the outer surface of said cylindrical member, a shaft-like axis secured to the cylindrical member and communicating with the interior of the chamber, and a rider carried by the support element and slidable within the cylinder groove whereby the reciprocating motion of the bellows will be translated into a desired movement of the cylinder.

5. A device for transmitting motion into a sealed chamber comprising, a bellows hermetically sealed at one end to the wall of the chamber, a sealing disc overlying the opposite end of the bellows, means in contact with said disc for imparting a reciprocating motion to the bellows, a support element secured within the bellows to the underside of the sealing disc, vertically disposed guide members secured to the outer wall of the chamber within the bellows and in lateral contact with the support element, a cylindrical member slidably mounted within the support element, a continuous sinuous groove in the outer surface of said cylindrical member, a shaft-like axis secured to the cylindrical member and communicating with the interior of the chamber, and a rider carried by the support element and slidable within the cylinder groove whereby the reciprocating motion of the bellows will be translated into a desired movement of the cylinder.

6. A device according to claim 1, in which the cylindrical member is provided with two continuous intersecting, sinuous grooves.

7. A device for transmitting motion into a sealed chamber comprising, a bellows hermetically sealed at one end to the wall of the chamber, a sealing disc overlying the opposite end of the bellows, means in contact with said disc for imparting a reciprocating motion to the bellows, a grooved cylindrical support element secured within the bellows to the underside of the sealing disc, a swivel joint between the disc and support element, vertically disposed guide members secured to the outer wall of the chamber within the bellows and in lateral contact with the support element, a cylindrical member slidably mounted within the support element, two continuous intersecting, sinuous grooves in the outer surface of said cylindrical member, a shaft-like axis secured to the cylindrical member and communicating with the interior of the chamber, and a rider carried by the support element groove and slidable within the cylinder grooves whereby the reciprocating motion of the bellows will be translated into a desired movement of the cylinder.

8. A device for transmitting motion into a sealed fluid bearing chamber comprising, a bellows hermetically sealed at one end to the wall of the chamber, a sealing disc overlying the opposite end of the bellows, means to vary the fluid pressure within the chamber with respect to the fluid pressure without the said chamber to impart a reciprocating motion to the bellows disc, a support element located within the bellows and journaled to the bellows disc, a cylindrical member coupled at its upper end to the support element, a continuous, sinuous groove in the outer surface of the cylindrical member and a rider carried by the support member and slidable within the cylinder groove whereby the reciprocating motion of the disc will be translated into a desired rotary movement of the cylinder.

References Cited in the file of this patent

UNITED STATES PATENTS

| | | |
|---|---|---|
| 205,120 | Moreau et al. | June 18, 1878 |
| 271,909 | Parmenter | Feb. 6, 1883 |
| 924,509 | Taylor | June 8, 1909 |
| 1,263,487 | Thorne | Apr. 23, 1918 |